May 24, 1966  E. WEICHEL  3,252,277
MACHINE FOR THE LOADING, TRANSPORTING AND
UNLOADING OF BULK MATERIALS
Filed June 6, 1961  5 Sheets-Sheet 1

Inventor
Ernst Weichel
By Allen A. Lisher
Attorney

May 24, 1966  E. WEICHEL  3,252,277
MACHINE FOR THE LOADING, TRANSPORTING AND
UNLOADING OF BULK MATERIALS
Filed June 6, 1961  5 Sheets-Sheet 2

Inventor
Ernst Weichel
By Allen A. Dicke
Attorney

Inventor
Ernst Weichel
By Allen A. Dicke
Attorney

3,252,277
MACHINE FOR THE LOADING, TRANSPORTING
AND UNLOADING OF BULK MATERIALS
Ernst Weichel, 1 Bahnhofstrasse, Heiningen, near
Coeppingen, Germany
Filed June 6, 1961, Ser. No. 115,208
Claims priority, application Germany, Nov. 15, 1960,
W 28,917
12 Claims. (Cl. 56—345)

The present invention relates to a working method and to a machine for the loading, transporting and unloading of bulk materials of all sorts, for example of hay, green fodder, straw, straw bales etc., particularly for agricultural purposes.

An economic loading method has to fulfill the following requirements of agriculture: high output per hour, low power consumption, short periods for preparation, true one man-operation by the tractor driver, good driving properties, simple unsensitive and economic construction, adaptability to various unloading devices, suitability for green, withered and dry fodder.

Many working methods and machines are known for the loading of cereal crops e.g. rear loaders, field chaff-cutters, front loaders, fodder loaders, collector presses etc. Although the same fulfill one or more of the requirements of agriculture mentioned hereinabove, all these known working methods or machines have the disadvantage in common that—owing to their actual principle of operation—they cannot fulfill at least one or more of these important requirements of agriculture at all or can fulfill them only insufficiently.

The invention provides a loading method, which fulfills all the above requirements equally well. The method according to the invention for the loading, transporting and unloading of bulk materials on a mobile loading platform by means of a mechanical conveyor mechanism is characterised in that the goods emerge from the conveyor mechanism substantially at the level of the loading area and approximately in vertical direction. Preferably the goods located on the loading area are carried off mechanically, substantially in the horizontal direction from the outlet opening of the conveyor mechanism during and/or after the loading operation.

The machine according to the invention for carrying out this method consists in a receiver drum, an adjoining conveyor duct in which the conveyor elements are mounted and the outlet opening of which is arranged substantially on the same level as the loading area, and a roller- or scraper-floor capable of being driven simultaneously with the receiver drum and with the conveyor means.

Further details of the invention are disclosed in the following description of some embodiments given by way of example with reference to the accompanying drawings, in which.

Corresponding components in each embodiment are denoted throughout the various views by identical reference characters.

The main features of the loading machine according to the invention are now described in connection with FIGS. 1 through 4, 11 and 12.

Figure 1:
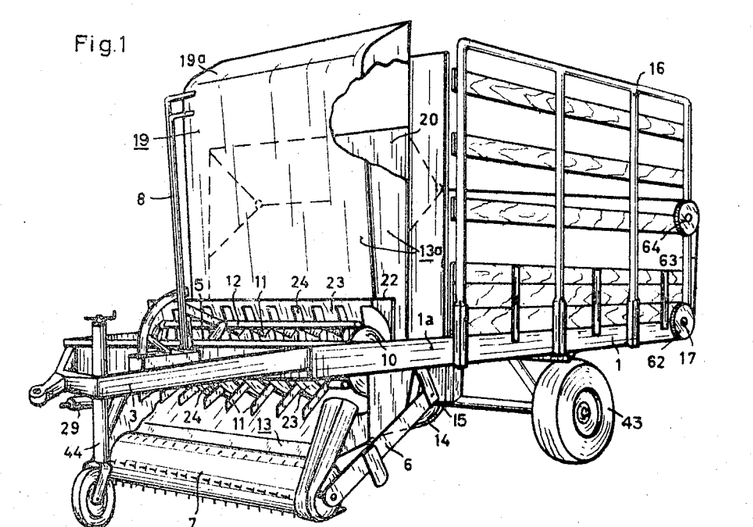
FIG. 1 is a perspective view of an embodiment of the machine according to the invention as seen from the left.
Figure 2:
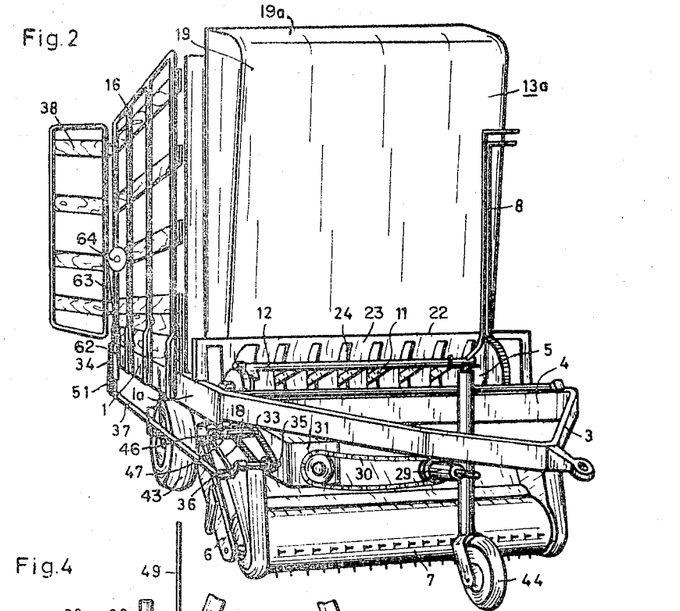
FIG. 2 is a view of the machine of FIGURE 1 as seen at an angle from the front.

Looking first to the embodiment of FIGS. 1 and 2, the chassis 1 of a single axle-trailer is extended in front in such a manner that between the extensions 1a, whereon the tongue means 3 are secured, the transverse member 4 and a roller or scraper floor 2 on said chassis 1, a recess 5 is formed for the accommodation of a loading device. The same comprises a pick-up drum 7, which is mounted on a cantilever 6 tiltable about pivots 15, and a conveyor drum 10 journalled on the extensions 1a which bear a plurality of pivotally mounted rakes 12 studded with prongs 11, the direction of rotation of which is the opposite of that of the pick-up drum 7. The prongs 11 of the pivotally mounted rakes 12 of the conveyor drum 10 move in and out of a conveyor duct 13, the bottom 14 of which forms substantially a circular arc co-axial with the axis of the conveyor drum 10, and which terminates at its upper end at the level of the floor 2 of the vehicle in the vertical direction.

In the superstructure 16 of the vehicle a transverse wall 20 may be arranged which forms the rear wall of a continuation 13a of the conveyor duct 13. The front wall 19 of the conveyor duct continuation 13a forms at the same time the front wall of the superstructure 16 of the vehicle. Its upper part 19a extends in this embodiment backward at an arc over the rear wall 20 which is of lower height. The material advanced and conveyed through the conveyor duct 13 will press the material which is present above it through the upright continuation 13a where it is eventually turned by the arched portion 19a of wall 19 so that it will drop into the main gathering portion of the superstructure 16 onto the scraper floor 2. A compression is accomplished within the duct 13a due to the weight of the material. The lower part of said front wall 19 is continued at 22 by a grate 23 which has slots 24 matching the prongs 11. The grate 23 substantially co-axially surrounds the conveyor drum 10 and is fixed at its lower end to the transverse member 4. Since the prongs 11 protrude only through the slots 24 in the grate 23 into the conveyor duct 13, any coiling of the material conveyed about the conveyor drum 10 is prevented.

The conveyor duct continuation 13a may be formed of closed sheet metal walls 19, 20 as shown or of laths with interstices. In the embodiment of FIGS. 1 and 2 it flares out from the bottom upward, i.e. with an upwardly increasing clear width. Wall 19 may be provided at its interior surface with a plurality of hooks 21, illustrated in connection with the embodiment of FIGS. 3 and 4, but useful also in the embodiment of FIGS. 1 and 2. The hooks 21 let the goods conveyed pass in the direction from the bottom upward but prevent them from sliding back. These hooks 21 are fitted at an angle so that they divert the goods conveyed outwardly in the direction towards the side walls of the superstructure 16. Thereby complete charging of the superstructure 16 of the vehicle is made possible, even when it is wider than the pick-up drum 7 and/or the conveyor channel 13, 13a.

The pivotally mounted rakes 12 of the conveyor drum 10 are controlled by means of follow-up rollers and cams in such a manner that they stand perpendicular to the conveyor duct while passing through the same and are withdrawn from the fodder or the duct 13, respectively, in the direction of driving the vehicle, when substantially at the level of the loading area thereof.

Figure 11:
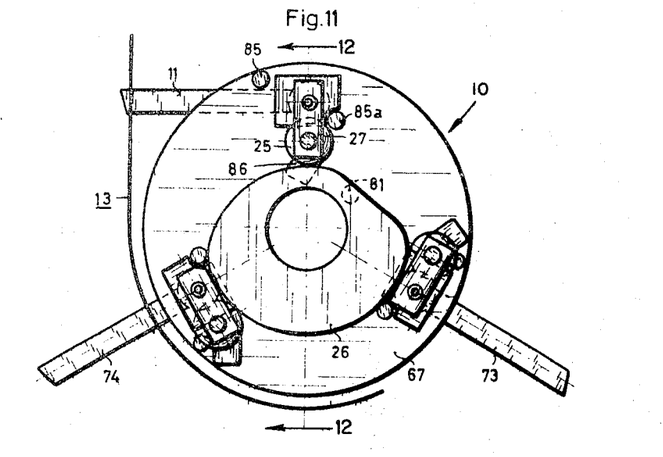
FIG. 11 is a side elevation along line 11—11 of FIG. 12 showing the bearing construction of the conveyor drum and the operating means for prongs carried thereby.
Figure 12:
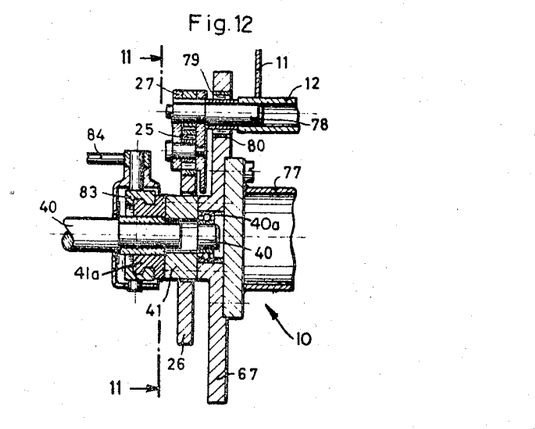
FIG. 12 is a section taken along line 12—12 of FIG. 11.

A suitable mechanism for this purpose is shown in FIGS. 11 and 12. As shown therein, the conveyor drum 10 consists of a sturdy axle 77 which may be made of a tube, at each end (only the driving end shown) of which a disc 67 is fixed for the mountings of the rakes 12 which are constructed as pins 78 with roller bearings 79 in bores 80. The free ends of the pins 78 have lugs 27 with follower rollers 25. The latter contact a cam disc 26, which is fixed on one of the extensions 1a outside the conveyor drum 10. On the driving end of the conveyor drum the same is journalled freely rotatable by means of a bearing 40a on the shaft 40 of the worm gearing 39 (see FIG. 4), and is fixedly connected with one half of a dog clutch 41. On the shaft 40 of the worm gearing the other half 41a of the dog clutch 41 is attached in such a manner that it is restrained from relative rotation but slidable axially by means of a collar 83 engaging into the slidable half 41a and a lever 84. The stationary cam disc 26 is so shaped that the prongs 11 stand substantially radially with respect to the circumference of the conveyor drum between the positions 73 and 74. Then they are tipped about 90°, because the rollers 25 engage the lower part of cam disc 26, so that when leaving the conveyor channel 13 they stand substantially tangential to the circumference of the conveyor drum 10. By the stop 81 mounted on the cam disc 26, which is abutted by an extension 86 of the lug 27 when the prong 11 has been withdrawn from the conveyor channel 13, the prongs are restored to the starting position. The stops 85 and 85a confine the range of tilting of the prongs to approximately 90° even when the follower rollers 25 cannot contact the cam disc 26.

In the embodiment of FIGS. 1 and 2, the conveyor drum 10 is driven by means of a chain 33 from a gear box 31, the drive of the pick-up drum 7 being derived from the conveyor drum 10 by chain 46 and belt 18 in a manner similar to that described below in connection with the embodiment illustrated in FIGS. 3 and 4. The gear box 31 is driven from the tractor by means of its power take-off shaft through the connector shaft 29 and chain drive 30. The advance of the roller- or scraper-floor 2 is effected by a step drive 34 (FIG. 2) and pusher pawl 51 combination, such as disclosed in the publication "Landsmachinen," by Erich Schilling, vol. 3, 1958, published by Luthe-Druck, Cologne, Germany, which is moved in a manner known per se at a variable stroke by means of a pull rod 37, which is articulated to an eccentric 36 keyed to the shaft 35 of the gear box. The advance of the roller- or scraper-floor at each stroke of the pusher pawl is accordingly steplessly controllable. It may be operated together with the pick-up and conveyor-drums or separately. In the embodiment of FIGS. 1 and 2 the pick-up drum 7 is adjustable in height by means of a lever 8 connected to cantilever 6.

Figure 3:
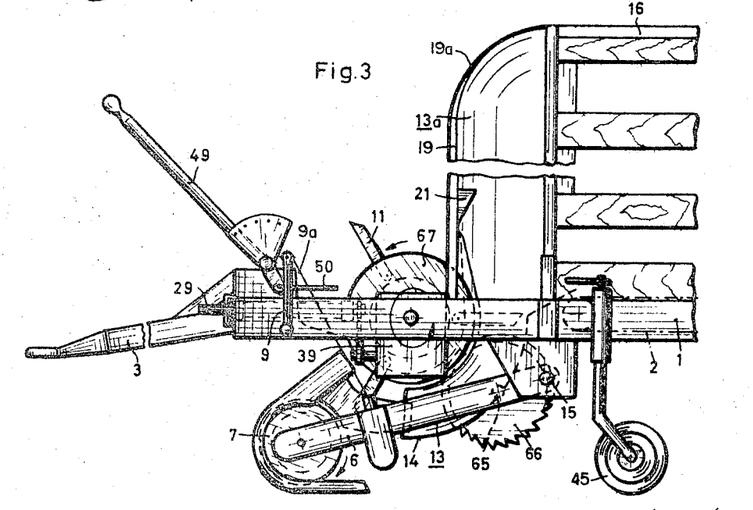
FIG. 3 is a partly sectioned side elevation of the pick-up and conveyor mechanism of a somewhat modified embodiment on a larger scale.
Figure 4:
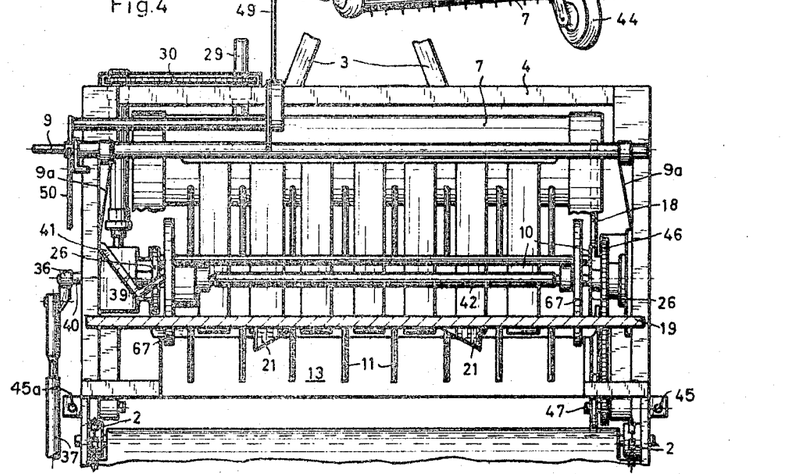
FIG. 4 is a plan view of the embodiment of FIGURE 3.

Turning now to the embodiment of FIGS. 3 and 4 the raising of the pick-up drum 7 is effected by a winch operated by the detachable hand crank 9 through pull rope 9a. The drive of the form of FIGS. 3 and 4 leads in this embodiment from connector shaft 29 and chain 30 to a sturdy worm gearing 39, the worm gear shaft 40 of which can be coupled by means of a dog clutch 41 directly to the through-shaft 42 of the conveyor drum 10, which is of substantially identical construction as that described in connection with the embodiment of FIGS. 1 and 2 (see FIGS. 11 and 12). The eccentric 36 for the pull rod 37 for the step-drive of the roller- or scraper-floor 2 is mounted on the left-hand side of the vehicle in this embodiment directly at the free end of the worm gear shaft 40. Also in this embodiment the drive mechanism for the scraper floor 2 is of the well-known wheel and ratchet type, as illustrated in the above-referenced publication, wherein the advance of the floor can be adjusted. For this purpose, a hand lever 49 and connecting rod 50 are provided.

In this embodiment the pick-up drum 7 is driven from the intermediate shaft 47 through a belt 18, and this intermediate shaft is driven by a chain drive 46 from the conveyor drum 10. Since the intermediate shaft 47 is coaxial with the point of articulation 15 of the cantilever 6, the tension of the belt is not affected by the raising or lowering of the pick-up drum 7. The conveyor channel continuation 13a in this embodiment has no rear wall such as provided in the embodiment of FIGS. 1 and 2, so that the channel 13 ends substantially at the level of the loading area. The front wall 19 forms accordingly the front wall of the superstructure 16 of the vehicle.

The vehicle has two main wheels 43. An adjustable supporting wheel 44 (FIGS. 1 and 2) or two supporting wheels 45 and 45a mounted laterally on the vehicle (FIGS. 3 and 4) may serve for the support of the vehicle when parked. Thereby a four-wheeler vehicle with freely pivotal front wheels is formed the length, width and loading weight of which is not limited, as in single-axle vehicles, by the permissible saddle load on the pull means. The steering of such front wheels could be constructed in the usual manner as a so called axle steering.

Manner of operation: a towing device such as a tractor pulls the attached loading- and transporting-machine over the goods to be loaded while the goods are generally lying on the field in swaths, which goods are engaged by the pick-up drum 7 and are conveyed into the conveyor duct 13. There they are taken over by the prongs 11 of the conveyor drum 10 and are brought in the conveyor duct 13 substantially to the level of the loading area, where the conveyor prongs 11 are withdrawn from the conveyor duct 13. The further transport upward, i.e. up to the height of the superstructure 16 of the vehicle takes place by the pushing action of the subsequent goods, which are thereby compressed. In the embodiment of FIGS. 3 and 4 wherein no rear wall 20 of the feeder channel is provided the material which emerges from the duct at the level of the floor 2 will lie constantly over the discharge end of the duct so that the subsequently arriving material which is being conveyed by prongs 11 is forced to emerge against the pressure of the material already present at the top of the duct and to lift this material. Due to the weight of the quantity of material lying over the duct opening and partly hanging together with the material already lying on the scraper floor, the subsequently arriving material will be compressed quite strongly. In the embodiment of FIGS. 1 and 2 having a rear wall 20 in combination with wall 19, the material is initially compresesd in the conveyor duct extension 13a but the effect of the compression is somewhat reduced as the material passes over the rear wall 20 at its upper end. Subsequently the material conveyed is forced onto the roller- or scraper-floor which, depending on the compression and height of loading desired, transports the same either continuously or at certain time intervals in the direction towards the rear end of the loading area, until it is dammed up at the rear wall 38 of the superstructure 16. When the roller- or scraper-floor remains in operation subsequently, it must run under the goods conveyed so that further compression is effected. By the correct adjustment of the speed of advance of the roller- or scraper-floor any desired compression and height of loading may be attained even at a varying speed of driving the vehicle or a varying quantity of goods being transported per metre of driving distance covered.

After the filling of the loading space the pick-up drum 7 is raised by means of the hand lever 8 or 9, respectively, the power take-off shaft of the tractor is disengaged, and the vehicle is driven to the unloading place without any further readjustment. There the hinged rear wall 38 of the loading space 16 is opened, and the goods are unloaded in a few minutes by operating the roller- or scraper-floor. The vehicle is ready for renewed use in approximately the same time as required for attaching any other trailer to the tractor. Accordingly as a rule the use of so-called interchange trailers may be dispensed with. The goods after they are unloaded are conveyed to the storage place by a second person using any type of unloading appliance in the time interval until the next load arrives.

FIG. 1 moreover shows an additional appliance for speeding up the unloading. This appliance is particularly convenient when the loading area is substantially wider than the roller- or scraper-floor, or when a loaded material of light specific weight has been very greatly compressed. In these cases it must be expected that the roller- or scraper-floor as generally used is not always sufficient for the unloading of the vehicle since the loaded material forms voids. The appliance consists of two cable drums 62 (only one shown) which are mounted idly on the free ends of the drive shaft 17 of the scraper-floor secured to ratchet wheel 34 and are capable of being coupled to it. They are connected to a pull cable or a chain 63, which is passed over pulleys 64 on the side walls of the loading space 16 and which if required can be hooked to the front wall 19 of the loading space, as in the embodiment of FIGS. 3 and 4, or to the rear wall 20 of the conveyor duct continuation 13a, as in the embodiment of FIGURES 1 and 2. When for unloading purposes the cable drums 62 are coupled to the drive shaft 17 of the scraper-floor, the pull cable or chain 63 is coiled up and pulls the wall 19 or 20 as a pusher wall rearwardly with it. In this way the load is pulled off very quickly and safely; it may be even transferred to another vehicle (without a collecting appliance).

In the embodiment of FIG. 3 moreover an additional appliance for the comminuting of the goods conveyed is illustrated which may be of advantage when loading cumbersome materials. On the bottom 14 of the conveyor duct 13 a shaft 65 is arranged on which a plurality of cutter discs or saw blades 66 (only one being shown) is mounted, which protrude into the conveyor duct through slots and are interspersed with the conveyor prongs 11. The shaft 65 turns at a suitable rotational speed, so that the goods conveyed while pasing through the conveyor duct are comminuted to the size of the spacing of the discs 66 from one another. This cutting device requires little power.

Figure 5:
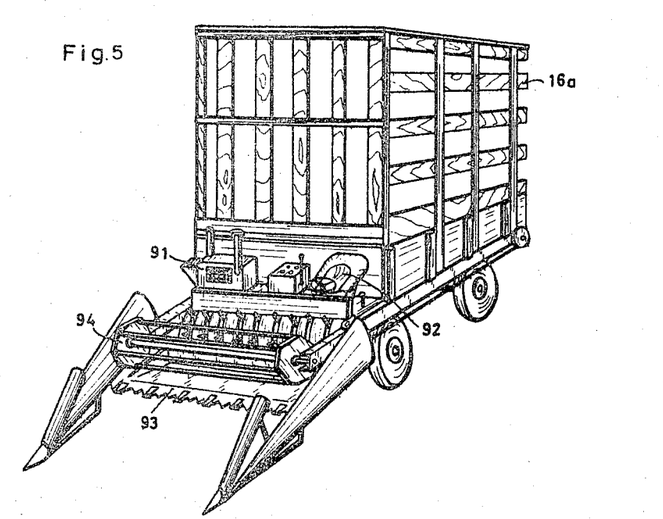
FIG. 5 is a perspective view of a self-propelled vehicle according to the invention.

FIG. 5 shows a further embodiment of the present invention. By building-in an engine with gear box 91, control elements and driver's seat 92, cutter mechanism 93, reel 94 etc. in the manner as generally known on self-driving combine harvesters, the loading device may be made self-driving. This results in a further improvement of the driving properties, the capability of negotiating rough ground, a small turning radius and a simplification of the drive. According to the invention moreover provision is made to construct the chassis of such a self-driving machine in conjunction with the mowing- or receiver- and conveyor-device as well as the engine with gear box in such a manner that at will either a loading space 16a with scraper-floor may be fitted with attachments. In this way an agricultural enterprise may carry out all the harvesting-, loading-, transporting- and unloading-operations with a single vehicle, which is constantly occupied all the year over. Thereby the costs of the machinery are considerably lowered.

Figures 6, 7:
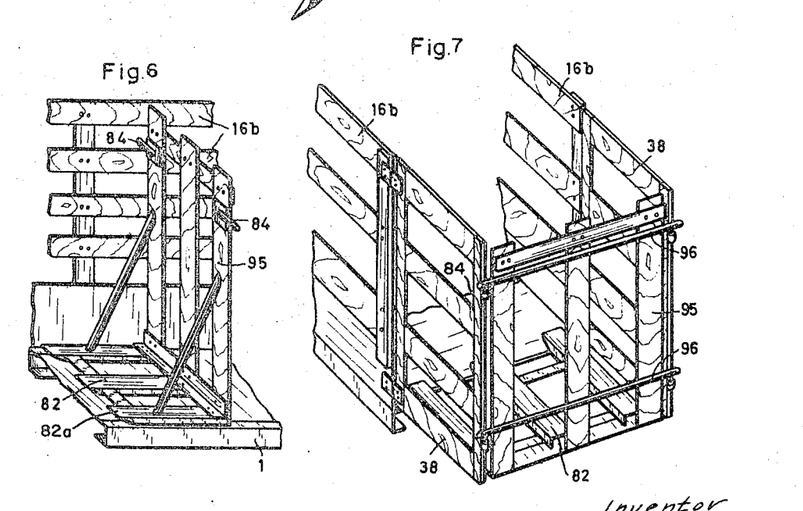
FIGS. 6 and 7 are perspective views of a device for enlarging the loading capacity of a machine according to the invention in an intermediate position and in the final position of a movable rear wall.

FIGS. 6 and 7 show a part view of the loading space 16b with an additionally usable device for reinforcing the compression of the goods loaded and for increasing the loading space. This device is useful particularly for the loading of dry hay and straw. In this event the hinged halves 38 of the rear wall are held e.g. by hooks (not shown) in a position as continuations of the side walls of the superstructure 16b, and coupled by bars 96. At the beginning of the loading operation a plate 82 carrying an additional rear wall 95 is placed in the forward portion of the loading space 16 on the roller- or scraper-floor. It prevents a premature spreading of the voluminous goods in the loading space, and effects by its friction on the floor a strong compression of the goods loaded right from the beginning of the loading operation. The rear wall 95 with the plate 82 moves slowly rearward during the loading operation together with the roller- and scraper-floor, being prevented from slipping over by pins 84 engaging into the interstices between the laths of the sidewalls of the load space 16b, until it abuts the bars 96. Since the forward edge of the plate 82 is chamfered at 82a from bottom to top, the roller- or scraper-floor may run underneath the same without damaging it. The unloading is carried out in the usual way after removing the bars 96 and the rear wall 95.

Figure 8:
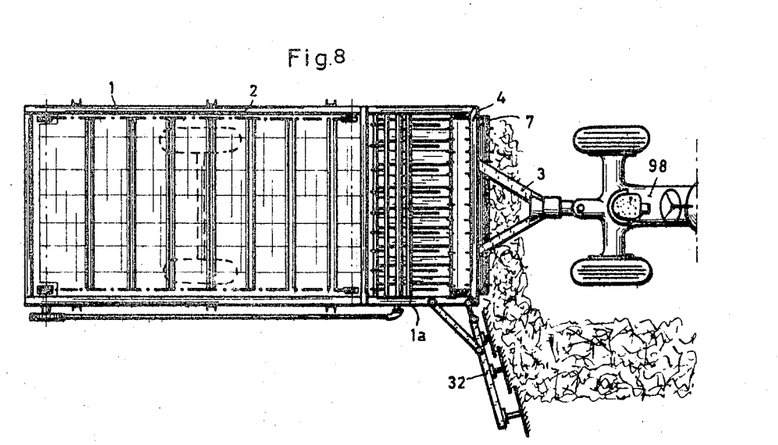
FIG. 8 is a plan view of an additional device for receiving the goods to be loaded laterally of the tractor.

FIG. 8 shows in plan view an additionally applicable device which allows picking up the goods to be loaded laterally of the tractor. On the extensions 1a of the chassis 1, a conventional device 32 for the raking or forming of swaths is articulated in such a manner that it can supply the goods to be conveyed to the pick-up drum 7 behind the tractor 98 while the latter is driving along the side of the swath.

Figure 9:
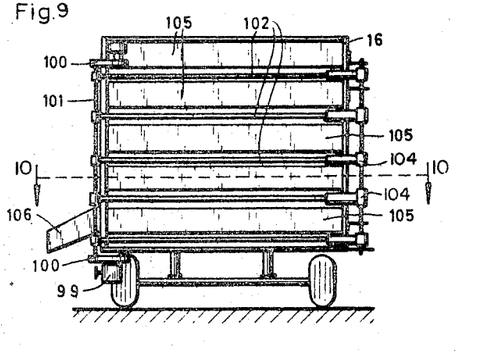
FIGS. 9 and 10 are a vertical and a horizontal section, respectively, of the loading space with an additional device for comminuting the goods conveyed when unloading the same laterally, FIG. 10 being taken along line 10—10 of FIG. 9 as viewed in the direction of the arrows.
Figure 10:
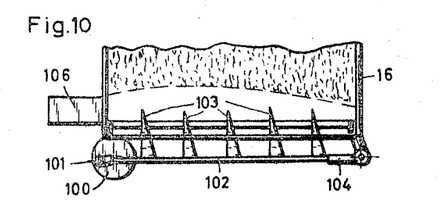

FIGS. 9 and 10 show an additionally applicable device for comminuting the goods conveyed when unloading the same, and for the continuous discharging of the loading space sideways without the formation of lumps. This device is particularly convenient, when the goods loaded are to be supplied to a processing machine placed by its side, or to a spreader aggregate. Two mutually opposite rotating discs 100 are connected with one another by a vertical, eccentrically arranged crank 101, and are set in rotation by gears in a gear box 99. On the crank 101 any desired number of push rods 102 are articulated, which rods are studded with prongs or knives 103. The free ends of the push rods are slidably held in pivotally suspended guides 104. The interstices between the push rods 102 are filled by sheet metal covers 105, so that the knives or prongs 103 dip into the goods conveyed actually only during half a revolution of the driving discs 100, and subsequently clean themselves automatically when passing through the slots between the sheet metal covers 105. The comminuted goods conveyed and falling down are unloaded through an aperture 106 in the side wall of the loading space 16 having a guide chute.

It will be noted that the constructions and method shown and described will serve admirably to accomplish the objects stated above. It is to be understood, however, that the constructions disclosed are intended merely as illustrative of the invention and not as limiting as various modications therein may be made without departing from the invention as defined by a proper interpretation of the claims which follow:

What I claim is:

1. A machine for the loading of bulk materials, including a mobile load surface, a conveyor duct mounted to said load surface, means for delivering the materials to said conveyor duct, means associated with said duct for transporting the materials therethrough, said duct being essentially vertical at the end thereof adjacent said load surface and terminating substantially at the level of said load surface so that the materials are discharged from said conveyor duct in upward direction, and means mounted above the load surface for transporting a lateral direction the materials to be discharged from said mobile load surface.

2. A vehicle for the compressing, loading and transportation of bulk materials comprising a mobile load surface, a superstructure providing generally vertical walls around said load surface, an elongated conveyor duct of essentially closed cross section mounted at one end thereof to said load surface, a conveyor means associated with said duct and substantially exteriorly thereof for delivering said materials to said conveyor duct, translating means for transporting said materials through said duct to said load surface, said duct containing a free end cooperating with an essentially vertical portion which is mounted to said load surface and terminates at the level thereof so that materials are discharged from said conveyor duct onto said load surface in approximately the vertical direction, and means on said load surface for transporting said materials rearwardly.

3. A vehicle for the compressing, loading and transportation of bulk materials comprising a mobile load surface, a superstructure providing generally vertical walls around said load surface, an elongated conveyor duct of essentially closed cross section mounted at one end thereof to said load surface, a conveyor means associated with said duct for delivering said materials to said conveyor duct, translating means for transporting said materials through said duct to said load surface, said duct containing a free end cooperating with an essentially vertical portion which is mounted to said load surface and terminates at the level thereof so that materials are discharged from said conveyor duct onto said load surface in approximately the vertical direction, and means on said load surface for transporting said materials rearwardly,
said translating means including pivotable prong means extending within the approximately vertical portion of said conveyor duct for engagement with the material therein to raise said material in a vertical direction to the level of said load surface.

4. A vehicle for the compressing, loading and transportation of bulk materials comprising a mobile load surface, a superstructure providing generally vertical walls around said load surface, an elongated conveyor duct of essentially closed cross section mounted at one end thereof to said load surface, a conveyor means associated with said duct for delivering said materials to said conveyor duct, translating means for transporting said materials through said duct to said load surface, said duct containing a free end cooperating with an essentially vertical portion which is mounted to said load surface and terminates at the level thereof so that materials are discharged from said conveyor duct onto said load surface in approximately vertical direction, and means on said load surface for transporting said materials rearwardly,
said translating means including pivotable prong means extending within the approximately vertical portion of said conveyor duct for engagement with the material therein to raise said material in a vertical direction to the level of said load surface,
means mounted above said load surface for transporting said materials discharged from said conveyor duct in a lateral direction.

5. A vehicle for the compressing, loading and transportation of bulk materials comprising a mobile load surface, a superstructure providing generally vertical walls around said load surface, an elongated conveyor duct of essentially closed cross section mounted at one end thereof to said load surface, a conveyor means associated with said duct for delivering said materials to said conveyor duct, translating means for transporting said materials through said duct to said load surface, said duct containing a free end cooperating with an essentially vertical portion which is mounted to said load surface and terminates at the level thereof so that materials are discharged from said conveyor duct onto said load surface in approximately the vertical direction, and means on said load surface for transporting said materials rearwardly,
said translating means including pivotable prong means extending within the approximately vertical portion of said conveyor duct for engagement with the material therein to raise said material in a vertical direction to the level of said load surface,
means mounted above said load surface for transporting said materials discharged from said conveyor duct in a lateral direction,
comminuting means extending into said conveyor duct for reducing the size of said materials.

6. A vehicle for the compressing, loading and transportation of bulk materials comprising a mobile load surface, a superstructure providing generally vertical walls around said load surface, an elongated conveyor duct of essentially closed cross section mounted at one end thereof to said load surface, a conveyor means associated with said duct for delivering said materials to said conveyor duct, translating means for transporting said materials through said duct to said load surface, said duct containing a free end cooperating with an essentially vertical portion which is mounted to said load surface and terminates at the level thereof so that materials are discharged from said conveyor duct onto said load surface in approximately the vertical direction, and means on said load surface for transporting said materials rearwardly,
said translating means including pivotable prong means extending within the approximately vertical portion of said conveyor duct for engagement with the material therein to raise said material in a vertical direction to the level of said load surface,
comminuting means extending into said conveyor duct for reducing the size of said materials.

7. A vehicle for the compressing, loading and transportation of bulk materials comprising a mobile load surface, a superstructure including generally vertical walls around said load surface, a conveyor duct mounted to said load surface, means for delivering the materials to said conveyor duct, means associated with said duct for transporting the materials therethrough, said duct being essentially vertical at the end thereof adjacent said load surface and terminating substantially at the level of said load surface and near the forward end thereof, so that the materials are discharged from said conveyor duct in approximately the vertical direction, said superstructure further including at least one unloading opening, and means for extending the rear wall of the conveyor duct upwardly toward the top of the superstructure so that the materials are delivered at a point above the load surface.

8. A vehicle for the compressing, loading and transportation of bulk materials comprising a mobile load surface, a superstructure including generally vertical walls around said load surface, a conveyor duct mounted to said load surface, means for delivering the materials to said conveyor duct, means associated with said duct for transporting the materials therethrough, said duct being essentially vertical at the ends thereof adjacent said load surface and terminating substantially at the level of said load surface and near the forward end thereof, so that the materials are discharged from said conveyor duct in approximately the vertical direction, said superstructure further including at least one unloading opening, and comminuting blades which extend into the conveyor duct through slots formed in one of the walls of said conveyor duct.

9. Means for the compressing, loading and transportation of bulk materials comprising a vehicle having ground-engaging wheels, a load surface, a superstructure including generally vertical walls around said load surface, a conveyor duct mounted to said load surface, power driven pickup means for delivering the material to said conveyor duct, power driven means associated with said duct for transporting the materials therethrough, said duct being essentially vertical at the end thereof adjacent said load surface and terminating substantially at the level of said load surface, so that the materials are discharged from said conveyor duct in approximately the vertical direction, together with a power source for supplying power to said power driven means, said power driven means for transporting the materials through the conveyor duct comprising a conveyor drum and a plurality of prongs carried by said drum and extending into said conveyor duct through slots in one of the walls of said duct and into contact with said materials.

10. The combination according to claim 9 in which the conveyor drum carries a plurality of spaced shafts near its periphery oscillatable relative to the drum, a plurality of parallel prongs spaced along each of said shafts, a cam follower arm fixed to each of said shafts and a fixed cam against which said cam follower arms bear, the cam being so formed that it forces said cam follower arm, its shaft and prongs into a position where the prongs extend generally radially of the drum while they pass through the conveyor duct but may swing toward the circumferential position relative to the conveyor drum during the balance of the rotation of the drum.

11. The combination according to claim 9 together with means on the load surface for transporting the materials rearwardly and driving means from said drum to said transporting means, said driving means including a clutch and a ratchet and pawl mechanism.

12. Means for the compressing, loading, and transportation of bulk materials comprising a vehicle having ground-engaging wheels, a load surface, a superstructure including generally vertical walls around said load surface, a conveyor duct mounted to said load surface, power driven pickup means for delivering the material to said conveyor duct, power driven means associated with said duct for transporting the material therethrough, said duct being essentially vertical at the end thereof adjacent said load surface, and terminating substantially at the level of said load surface so that the materials are discharged from said conveyor duct in approximately the vertical direction, together with a power source for supplying power to said power driven means, and a power driven unloading mechanism including a generally horizontally disposed rod provided with upwardly extending teeth and means for giving said rod an orbital movement in such a manner that the prongs engage the materials only when moving in one direction.

References Cited by the Examiner
UNITED STATES PATENTS

| | | | |
|---|---|---|---|
| 1,463,492 | 7/1923 | Varland | 275—1 |
| 1,780,299 | 11/1930 | Jackson | 214—519 |
| 2,641,097 | 6/1953 | Mast | 56—364 X |
| 2,699,031 | 1/1955 | MacDonald | 56—364 |
| 2,729,047 | 1/1956 | Cheatum | 56—344 |
| 2,783,606 | 3/1957 | Wilson | 56—364 |
| 2,795,100 | 6/1957 | Sund | 56—344 |
| 2,829,481 | 4/1958 | Jarvis | 56—364 |
| 2,839,885 | 6/1958 | Eischens | 56—364 |

ABRAHAM G. STONE, *Primary Examiner.*

CARL W. ROBINSON, ANTONIO F. GUIDA, ARNOLD RUEGG, T. GRAHAM CRAVER, *Examiners.*

UNITED STATES PATENT OFFICE
CERTIFICATE OF CORRECTION

Patent No. 3,252,277                                                    May 24, 1966

Ernst Weichel

It is hereby certified that error appears in the above numbered patent requiring correction and that the said Letters Patent should read as corrected below.

In the grant, line 3, and in the heading to the printed specification, line 5, for "Coeppingen", each occurrence, read -- Goeppingen --; column 3, line 56, for "Landsmachinen" read -- Landmaschinen --; column 6, line 73, after "transporting" insert -- in --.

Signed and sealed this 8th day of August 1967.

SEAL)

Attest:

Edward M. Fletcher, Jr.                                          EDWARD J. BRENNER Attesting Officer                                                         Commissioner of Patents